(12) United States Patent
Cook et al.

(10) Patent No.: US 9,090,193 B2
(45) Date of Patent: Jul. 28, 2015

(54) MOVING CLEANOUT FOR RECIPROCATING CONVEYOR SYSTEM

(71) Applicants: John Cook, Madras, OR (US); Kenneth Stout, Madras, OR (US); Daniel Jackson, Madras, OR (US); Randall Mark Foster, Madras, OR (US)

(72) Inventors: John Cook, Madras, OR (US); Kenneth Stout, Madras, OR (US); Daniel Jackson, Madras, OR (US); Randall Mark Foster, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 350 days.

(21) Appl. No.: 13/850,851

(22) Filed: Mar. 26, 2013

(65) Prior Publication Data

US 2014/0294545 A1    Oct. 2, 2014

(51) Int. Cl.
*B60P 1/00*     (2006.01)
*B60P 1/14*     (2006.01)

(52) U.S. Cl.
CPC .. *B60P 1/006* (2013.01); *B60P 1/00* (2013.01)

(58) Field of Classification Search
CPC ..................... B60P 1/00; B60P 1/06
USPC .................................... 414/325, 527
See application file for complete search history.

(56) References Cited

U.S. PATENT DOCUMENTS

| 4,629,390 | A  | * | 12/1986 | Burke ........................... 414/527 |
|---|---|---|---|---|
| 6,357,578 | B1 | * | 3/2002 | Shelby ........................ 198/750.2 |
| 6,672,822 | B1 | * | 1/2004 | Moyna .......................... 414/517 |
| 6,974,296 | B2 | * | 12/2005 | Simrin ....................... 414/525.1 |
| 7,320,572 | B2 | * | 1/2008 | Smith ........................... 414/527 |
| 7,326,023 | B2 | * | 2/2008 | Hagenbuch ................... 414/513 |
| 7,510,071 | B2 | * | 3/2009 | Foster ........................ 198/750.2 |
| 7,878,751 | B2 | * | 2/2011 | Hagenbuch ................... 414/517 |
| 8,007,219 | B1 | * | 8/2011 | Wilkens et al. ................ 414/527 |
| 2006/0045702 | A1 | * | 3/2006 | Golden et al. ................ 414/527 |
| 2006/0182576 | A1 | * | 8/2006 | Foster ........................ 414/525.1 |
| 2008/0304947 | A1 | * | 12/2008 | Stout et al. ................. 414/525.1 |

* cited by examiner

*Primary Examiner* — Saul Rodriguez
*Assistant Examiner* — Ashley Romano
(74) *Attorney, Agent, or Firm* — Bruce A. Kaser

(57) ABSTRACT

The invention disclosed here is a moving headboard for use in connection with a reciprocating floor slat system. It is particularly well-suited for use in connection with load-hauling trailers that have built-in reciprocating floor slat conveyors for unloading the trailer. Trailers of this kind are used in lieu of hydraulic lifts and involve inching the load off the trailer. The moving headboard sweeps the trailer floor clean during the unloading process.

21 Claims, 9 Drawing Sheets

MOVING CLEANOUT FOR RECIPROCATING CONVEYOR SYSTEM

TECHNICAL FIELD

The invention disclosed here generally relates to conveyor systems that are known as reciprocating floor slat systems. More particularly, the invention relates to a moving headboard that cleans the interior floor surface and wall of a truck trailer, or similar walled container, that is unloaded via a built-in reciprocating floor slat system.

BACKGROUND OF THE INVENTION

Reciprocating floor slat conveyors typically involve a set of load-supporting slats that all move together in one direction, and then return, one-third at a time, in the other direction. Because the dynamic frictional surface contact area between slat surfaces and load is less during slat return, the load is inched along by the conveyor apparatus as the slats move back and forth. Floor slat reciprocation is usually always driven by hydraulics, with some variation in unloading speed, depending on different variables.

Reciprocating floor slat systems are often built into truck trailers that haul bulk materials like gravel, as an example. This type of design is used as an alternative to a dump truck (having a conventional hoist lift).

When reciprocating floor systems are used in a trailer, it is desirable that the trailer and reciprocating floor be left clean after an unloading operation. For this reason, several "cleanout" designs have been developed in the past. One cleanout design is described in U.S. Pat. No. 7,510,071, which describes a "plow" style cleanout apparatus. A more common type of cleanout apparatus is the flexible tarp system described in U.S. Pat. No. 6,974,296, issued to Simrin.

All of these cleanout systems involve a floor tarp portion, or something similar, that rides along the floor with the load. Usually, some of the load's material rests directly on the tarp, thus increasing the frictional forces between the tarp and the reciprocating floor slats underneath, so that the tarp sweeps the floor relatively clean by pulling a vertical barrier or headboard behind it as the trailer is unloaded. Either a portion of the tarp or other structure built aft of the tarp creates the cleanout surface that functions like a moving wall for preventing material from leaking forward as the cleanout apparatus moves aft during the unloading operation.

At the end of the unloading procedure, the tarp mostly exits and hangs over the end of the trailer before it is reeled back to the forward end of the trailer. One of the problems with this design is that the end of the tarp is sometimes buried in the pile of unloaded material sitting on the ground. The weight of the unloaded material sitting on the buried tarp stresses the tarp material and/or the tarp return mechanism when it is operated to pull the tarp free. Sometimes truck drivers will roll the truck forward to simply pull the tarp out of the load—which creates the same kind of problem.

A different problem associated with prior art systems is that they have a tendency to allow a certain amount of material to pass (or leak past) their lateral edges during the unloading process. Poor cleanout along the lateral edges of the cleanout system is more of a problem for loads like gravel or sand, as examples, because left-over material from one load may contaminate the next load involving a different kind of material. It is undesirable to have sand from one load mixed with asphalt in the next, as an illustrative example.

For the above reasons, there is a need to improve upon existing cleanout systems that are tailored for reciprocating floor assemblies.

SUMMARY OF THE INVENTION

The invention is an improved cleanout apparatus for a reciprocating floor slat conveyor. It is specifically designed to clean the floor slat conveyor when the floor is built inside a walled container, like a trailer, or similar walled structure. The cleanout apparatus sweeps material from the floor and sidewalls of the container as the floor slat conveyor unloads material from the container.

The cleanout apparatus comprises a headboard member that crosses or substantially spans the distance between the two lateral container sidewalls on opposite sides of the headboard member. Depending on the embodiment, the headboard member may be built on and supported by a base or base member, although other implementations are described below. At this point, it is appropriate to mention that patent protection is not intended to be limited to the specifics of any embodiment described here in text and drawings.

A flexible sheet, connected to the headboard member, rides on top of the reciprocating floor slat member, forward of the headboard member, and extends a certain distance in front of the headboard member. The flexible sheet provides a resting place for material that is being unloaded in between two wing members, or wings, that make up part of the clean out apparatus. The wings are "floating" and slide against the sidewalls as the headboard member moves.

More specifically, the pair of wing members are laterally mounted relative to each side of the headboard member. Each wing member is connected to the headboard member in a manner so that one is free to at least partially swing about an axis in a relatively unrestricted way. A flexible material like belting, or another kind of material, creates the free-floating action of the wing. In this manner, each wing can easily adjust to the kinds of variations in the lateral sidewalls that are typical to common trailers, as an example.

Each wing member has a section described here as a "lateral baffle portion" that extends forwardly of the headboard member. While, in the design described here, the baffle portion may be a larger, flat surface section, it defines a surface (regardless of its flatness) that is shaped to generally angle each wing outwardly (toward the sidewall) as the cleanout apparatus rides on the reciprocating floor slat conveyor.

Each wing member also includes a forward leading edge portion that terminates the leading edge of each wing, although the forward leading edge portion is a section that is angled relative to the baffle portion.

As an example, the forward leading edge portion may be a section that is created by making a bend in the material making up the lateral baffle portion. Regardless of its specific configuration, however, the forward leading edge portion of the wing defines an edge that wipes against its respective container sidewall as the cleanout apparatus moves. This edge may be made from a rubber belting material, or other suitable material, that has a leading edge surface (pushing toward the load) that terminates at a contact point that wipes, like a wiper blade, against the container sidewall.

The cleanout apparatus also has a secondary, rearward, sweeper member that follows the wing and is mounted to a lower lateral side of the headboard member. The rear sweeper also swings relative to the headboard member and container walls. In other words, it too floats against the sidewall, although it is smaller.

The flexible sheet can be made or dimensioned so that it is slightly wider than the distance between the sidewalls. This allows the lateral edges of the sheet to fold slightly in the region where trailer wall meets floor, to assist in the clean out function.

Other features included as part of the cleanout apparatus involve improvements that help return the apparatus to its original position in the trailer after the trailer load is emptied; and certain other refinements that help adjust the apparatus to the size of the trailer and improve its overall clean sweep function.

Among other things, the apparatus includes a rail member mounted to an outer surface of the wing that cooperates with a ramp or ramp member mounted to the container sidewall. The rail member is in alignment with the ramp member, the latter being near the container's end. As the leading edge of the wing slides against the ramp member, it is initially deflected inwardly and then passes over the ramp, like a bump. At that point, the rail member on the wing comes to rest on the ramp and holds the wing's baffle portion a fixed distance from the sidewall, preventing the leading edge from flaring outwardly relative to the container's end as at least part of the cleanout apparatus protrudes out from the container (at the end of the unloading process).

The apparatus also has small plow members mounted to the apparatus near opposite lower corners of the headboard member. These members are designed to clean material from the reciprocating floor slat conveyor, near each container side wall, for certain kinds of floor slat installations.

Another refinement involves placing adjustment brackets on opposite sides of the apparatus to adjust its width to different variations in container width. One of the overall advantages to the design is that it provides a modular unit that is easy to disassemble for shipping, but easy for the purchaser to assemble and adjust the unit to the dimensions of an existing trailer with the floor already installed.

One of the challenges to designing a cleanout apparatus for reciprocating floors involves coping with the different kinds of frictional forces that act on the apparatus. The flexible sheet described above has a cleanout function, but it also functions to pull the headboard and wings along the length of the trailer, because of the weight of the load that sits on the sheet.

The area of the sheet has to be great enough to create enough static frictional contact area so that the floor will not slip underneath the sheet as the floor moves the load. With the wing design described above, the dynamic frictional forces between the wings and sidewalls are reduced sufficiently so that the size of the sheet can be reduced. In effect, this means the sheet can be shortened so that it terminates at or just beyond the leading edges of the wings. When the apparatus reaches the end of its path of travel, a shorter length of the sheet hangs over the trailer's end and is less likely to be buried by some of the unloaded material.

The features summarized above, and others not summarized, are described in the following text which is to be read in conjunction with the accompanying drawings.

BRIEF DESCRIPTION OF THE DRAWINGS

In the drawings, like reference numerals and letters refer to like parts throughout the various views, and wherein.

DETAILED DESCRIPTION

Figure 1:
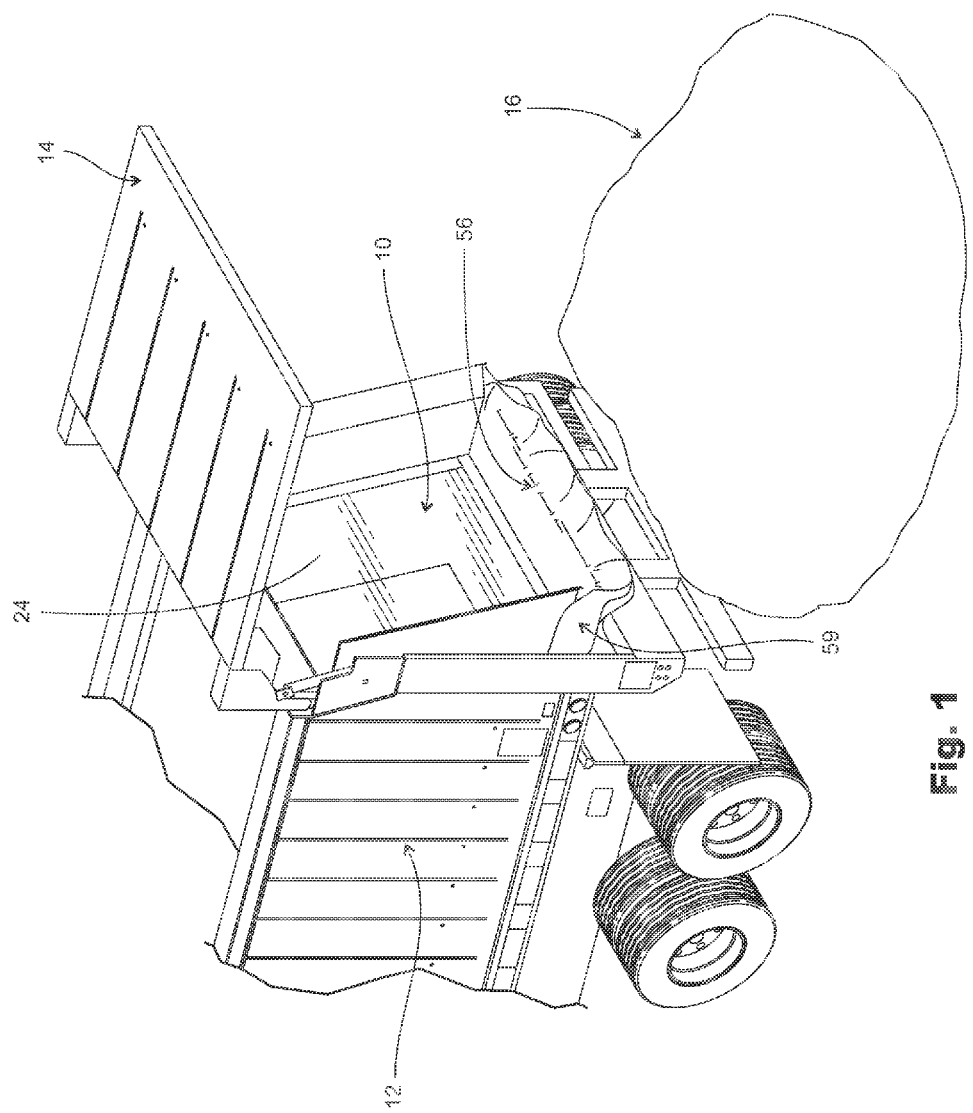
FIG. 1 is a pictorial view of the rear-end of a vehicle trailer, with a built-in reciprocating floor slat system, showing the moving headboard design disclosed here.

Referring now to the drawings, and first to FIG. 1. Shown generally at 10 is a moving headboard system ("moving headboard") constructed in accordance with the invention.

In FIG. 1, the headboard 10 is shown at the aft end of a conventional trailer, indicated generally by arrow 12. This type of trailer 12 would be very familiar to a person having involvement with the trucking industry and knowledge about how reciprocating floor systems are built into the floor beds of trailers.

Trailers of this type are typically pulled by semi-trucks or the like. In the figure, the trailer has a rear door 14 that is hinged to the back. As is common, the door 14 swings up when the trailer is unloaded. Also, as is common, the load is inched off the trailer 12 by the built-in reciprocating floor slat system. The load, in this case, is schematically illustrated at 16. It could be a pile of gravel, as a non-limiting example, although systems of this type are used to haul many different kinds of material in bulk.

The load bearing slats in a reciprocating floor may have different physical configurations. One configuration involves horizontal supporting surfaces that make the floor look similar to a conventional deck, except the deck slats are closely spaced and move back and forth. Another type of reciprocating floor design involves reciprocating slats that have "peaks" separated by stationary slats that have "valleys." This type of design is better suited for certain kinds of loads for structural reasons.

The headboard 10 described here can be used for either type of reciprocating floor slat system described above, or any other type of similar system where cleanout might be desired or needed. However, as is apparent from the illustrations, the headboard 10 is shown here used in connection with the "peaked" floor system, which is well-known in the industry.

Figure 2:
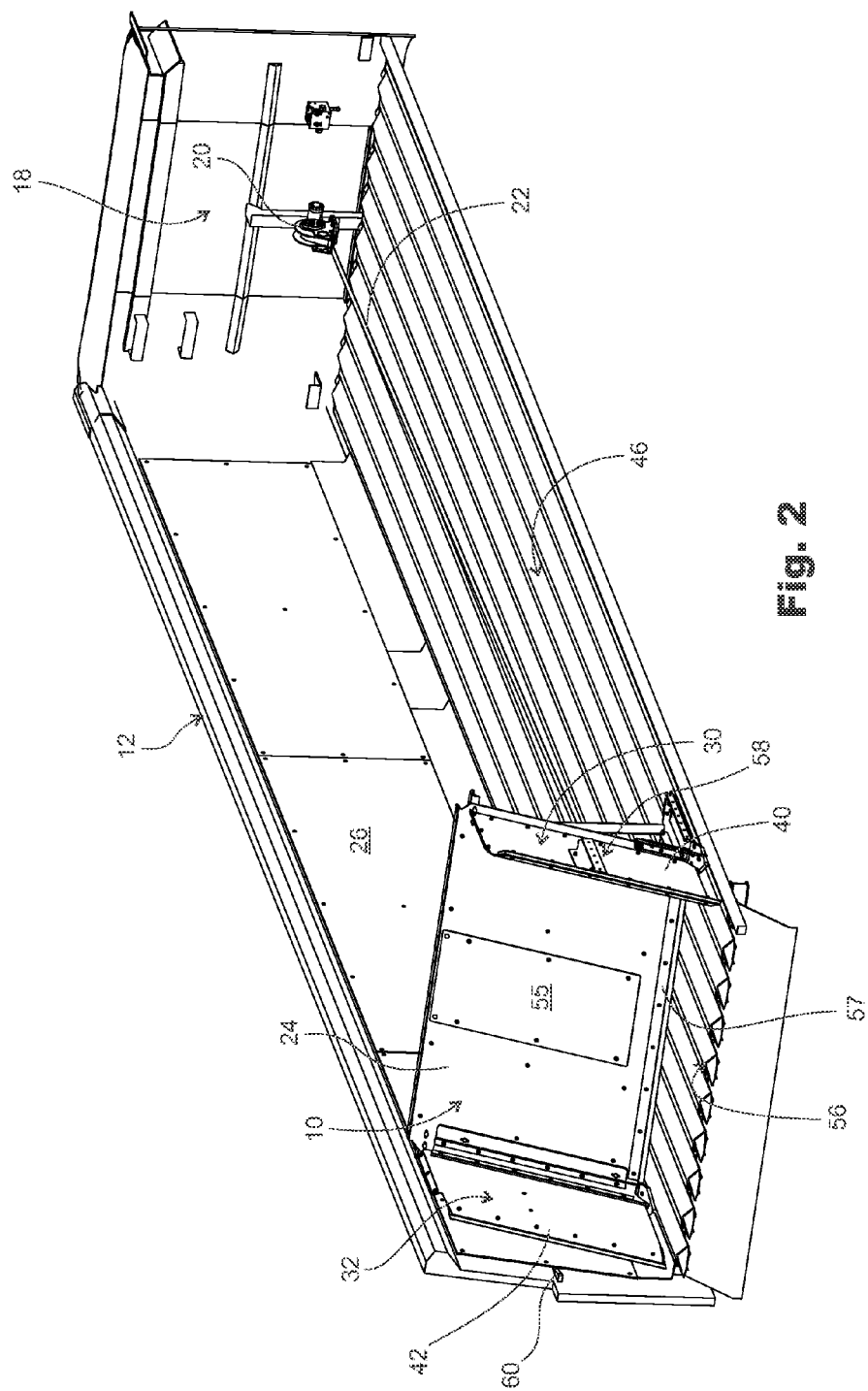
FIG. 2 is a pictorial view of the trailer portion shown in FIG. 1, with one sidewall of the trailer cut-away.

Turning now to FIG. 2, the headboard 10 is illustrated at the aft end of the trailer 12, but with one sidewall of the trailer removed. After the trailer is unloaded, the headboard 10 is returned to the forward end of the trailer (indicated generally at 18) by a winch 20 and strap 22 assembly. The winch and strap configuration 20, 22 is common to prior art systems, like the tarp system described above. In most instances, the winch and strap configuration 20, 22 limit the headboard's 10 path of travel, with the length of the unwound strap 22 preventing the moving headboard system 10 from falling out from the end of the trailer 12.

The headboard 10 has several different parts or portions. Directing attention now to FIG. 3, the headboard 10 includes, first, a headboard portion 24 that normally spans most of the distance between the trailer walls on opposite lateral sides of the headboard 10. Directing attention briefly to FIGS. 5 and 6, for example, the trailer's lateral walls are illustrated at 26, 28, respectively.

Figure 3:
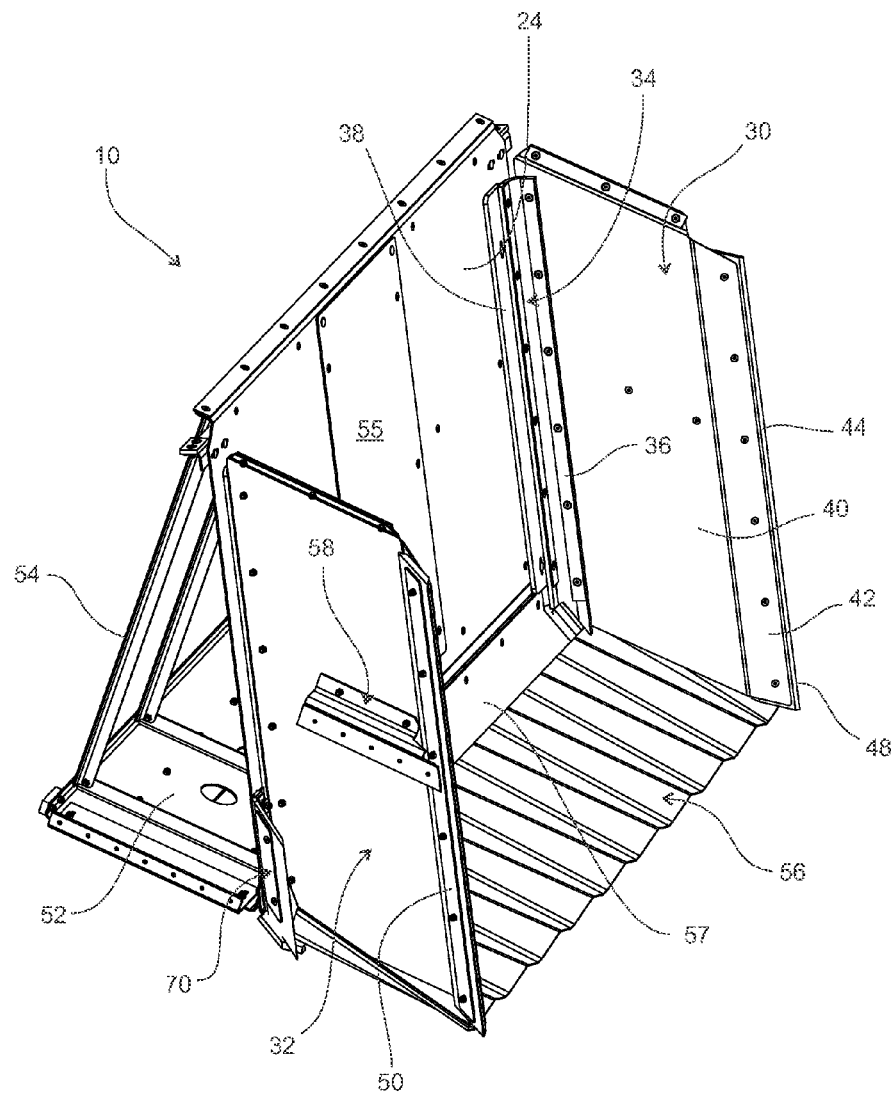
FIG. 3 is a pictorial view of a moving headboard constructed in accordance with one embodiment of the invention.

As illustrated in FIG. 3, the headboard 10 also includes two lateral side wings, indicated generally by arrows 30, 32. Each side wing is mounted to the headboard portion 24 by a hinge structure 34. The hinge structure 34 allows each wing to float against the sidewall.

The hinge structure 34 can take different forms. However, it can be a flexible material, like rubber, that is connected to headboard 24 and side wing 30 by bars or straps 36, 38 that are bolted to these respective parts. Sometimes these parts are called "bolt bars" and, as is apparent from the drawings, bolt bar arrangements are used to connect many of the flexible pieces of the present design to the headboard 10.

Referring now to the right-hand side wing 30, as shown in FIG. 3, it has a lateral baffle portion 40 and a forward leading edge portion 42. The leading edge portion 42 is angled relative to baffle portion 40. The leading edge portion 42 has an edge 44 that wipes against its respective container sidewall as the headboard 10 moves along the floor. For the sake of clarity, the floor is generally indicated by arrow 46 (see FIG. 2). The same kind of leading edge 44 on the opposite side wing 32 wipes against the lateral container wall 26 on the other side (see, e.g., FIG. 6).

The side wings 30, 32 may be manufactured from a single sheet of material such as aluminum, for example, with the forward leading edge portion 42 bent at an angle relative to the baffle portion 40. The leading edge 44 may be created by bolting a strip of another material 48 that has the necessary material characteristics (e.g., durable rubber) so that it can cleanly wipe the container wall without creating unnecessary friction. Three-quarter inch, four-ply conveyor belting is an example of a suitable material. The strip 48 is bolted to the forward-leading edge portion by a strip 50.

As will be described in greater detail later, the angular orientation of the leading edge portion 42 coupled with the extended edge 44 created by material 48 is important because it serves to reduce unwanted friction. In general terms, the headboard 10 needs friction with the underlying floor, because adequate friction is necessary to move the headboard 10 with the load. However, friction between side wings 30, 32 against the lateral container walls 26, 28 is normally unwanted friction because it opposes movement of the headboard 10.

As illustrated, the headboard portion 24 generally stands vertically upward. Headboard portion 24 is illustrated as having a slight angle relative to the vertical. Generally speaking, regardless of the angle, it creates a vertically upstanding, moving wall that helps contain and push the load out from the trailer during the trailer unloading process. The headboard portion 24 may be built with an access panel 55 that can be removed (unbolted) if needed.

As shown in FIG. 3, the headboard portion or part 24 is mounted to a base portion 52 and supported by braces 54. The base portion 52 also rides on the floor and provides another horizontal surface for allowing the floor to frictionally move the headboard 10.

Figure 7:
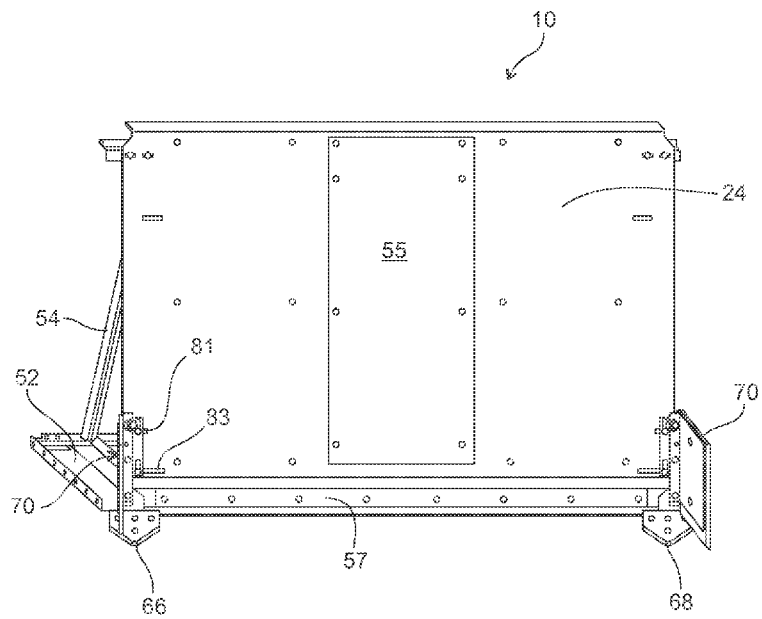
FIG. 7 is a view like FIG. 6 (with side wings removed)

Included as part of the overall headboard design illustrated here is a flexible tarp, indicated generally by arrow 56. The tarp 56 is connected to the headboard 10 and creates a load bearing surface between the headboard 24 and side wings 30, 32. Some of the load typically sits on tarp 56 with the force of the load creating friction between the tarp and the floor. The tarp 56 may be connected to the headboard part 24 by using a strip 57 (bolt bar) that clamps the tarp's edge to the headboard (see FIG. 7). Also, as was summarized above, the tarp 56 may be slightly wider than the width of the trailer such that its outer lateral edges are folded. These folds are generally illustrated at tarp 59 in FIG. 1.

Because of the reduced side wing friction described above, it offers the opportunity to shorten the length of the tarp 56 significantly relative to prior designs. In the FIG. 3 illustration, for example, the tarp extends forward of headboard 24 about the same distance as the side wings 30, 32. This is advantageous because when the headboard 10 reaches its final position of travel (as illustrated in FIG. 1), the length of the tarp is too short to be caught in the unloaded material. This improvement makes for an easier return of the headboard to the forward part of the trailer part 18 without stressing the tarp. However, it is only an example. There may be other configurations where it is desirable to use a longer tarp, similar to existing systems.

The side wings 30, 32 are free to swing and are driven to slide against and float over the lateral sidewalls 26, 28 of the trailer 12 only by load forces during the trailer unloading operation. The free-swinging nature of the wings 30, 32 allows the headboard to adjust to variations in trailer width along the length of the trailer. As a practical matter, trailer walls may be approximately 50 ft. in length. It is unlikely any trailer wall will be perfectly straight, over the course of an extended length, which means the headboard has to be able to naturally adjust and float freely against the walls as the headboard moves. The side wings 30, 32 are laterally divergent (outwardly) relative to the headboard portion 24 and these different parts create a type of sliding plow, with the counter-acting force of the load pushing the wings laterally into the trailer's walls sidewalls 26, 28.

Another aspect to the design disclosed here relates to how the headboard 10 operates when it is at the end of the trailer. Because the side wings 30, 32 float freely, the lateral forces created by the load may tend to push the side wings out when they eventually extend past the trailer's wall at the very end. It is important that the forward leading edges do not hook the trailer walls during the headboard return movement.

Figure 11:
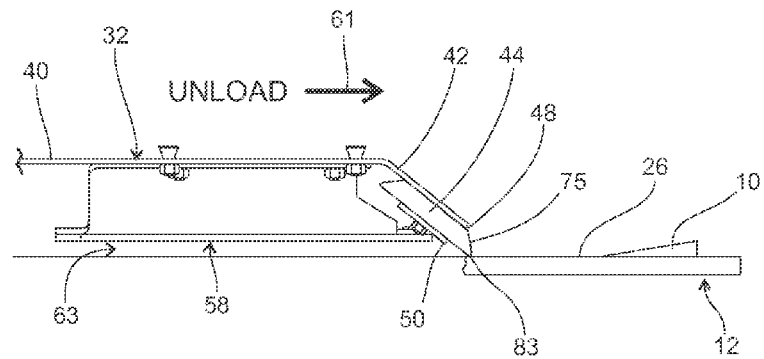
FIG. 11 is a view similar to FIG. 8, but is the first in a series of four views, and shows the leading edge portion of a side wing sliding along a trailer wall toward a wedge spacer or ramp member built into the wall—that prevents the leading edge from expanding laterally out past the end of the trailer.
Figure 12:
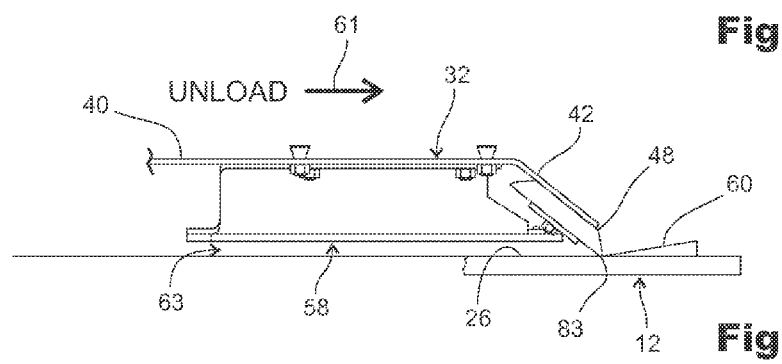
FIG. 12 is a view like FIG. 11, but is the second in the series.
Figure 13:
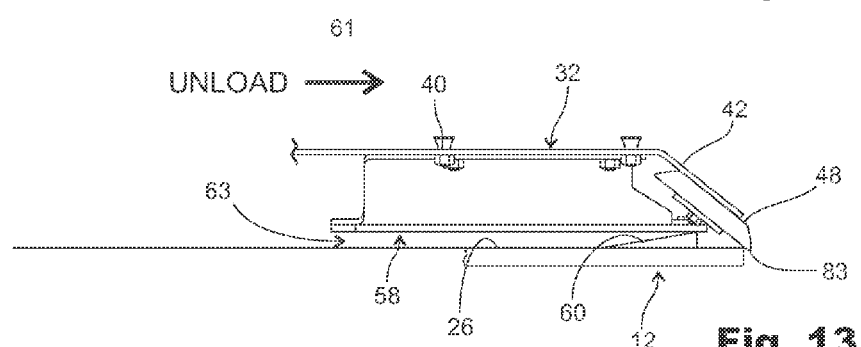
FIG. 13 is a view like FIGS. 11 and 12, but is the third in the series.
Figure 14:
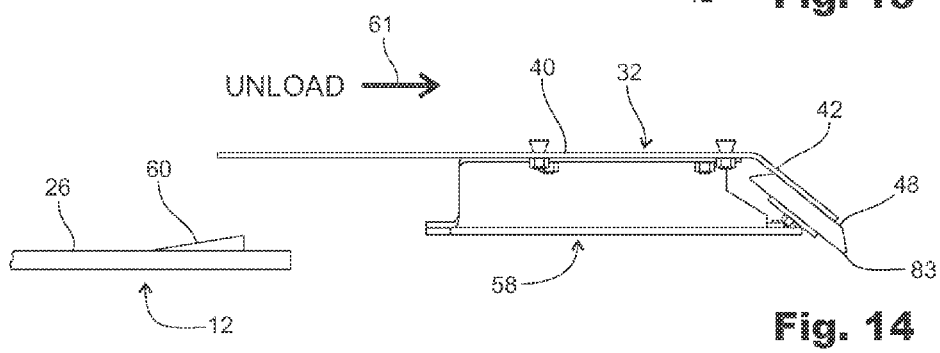
FIG. 14 is a view like FIGS. 11-13, but is the fourth and last in the series.

In order to prevent this, the outer surface of each lateral baffle portion 40 has a side rail, indicated generally at 58 (see, FIG. 3). Referring now to FIG. 2 (and FIG. 9—which shows the headboard with side wings removed), each lateral trailer sidewall has a small "bump" or ramp member or wedge 60 built into the wall at the trailer's end. The rail 58 on the side wing follows parallel to the wall 26 (see arrow 61 in FIG. 11) until the leading edge 44 (specifically, edge 48) hits the slope defined by wedge 60 (FIG. 12). The cam action caused by the slope of wedge 60 drives the leading edge portion 42 laterally inwardly over the length of the ramp (and swings the wing's leading edge portion laterally inwardly) until the edge 48 passes the bump created by wedge 60. At that point (FIG. 13), the height or thickness of the wedge 60 creates a spaced resting place for the side rail 58 (the space is indicated by arrow 63 in FIG. 8 and FIGS. 11-13) attached to the back-side of the wing 32, as the headboard 10 continues to move at least partially out from the trailer (see FIG. 14). The same thing happens on the opposite side of the trailer with respect to side wing 30.

Figure 4:
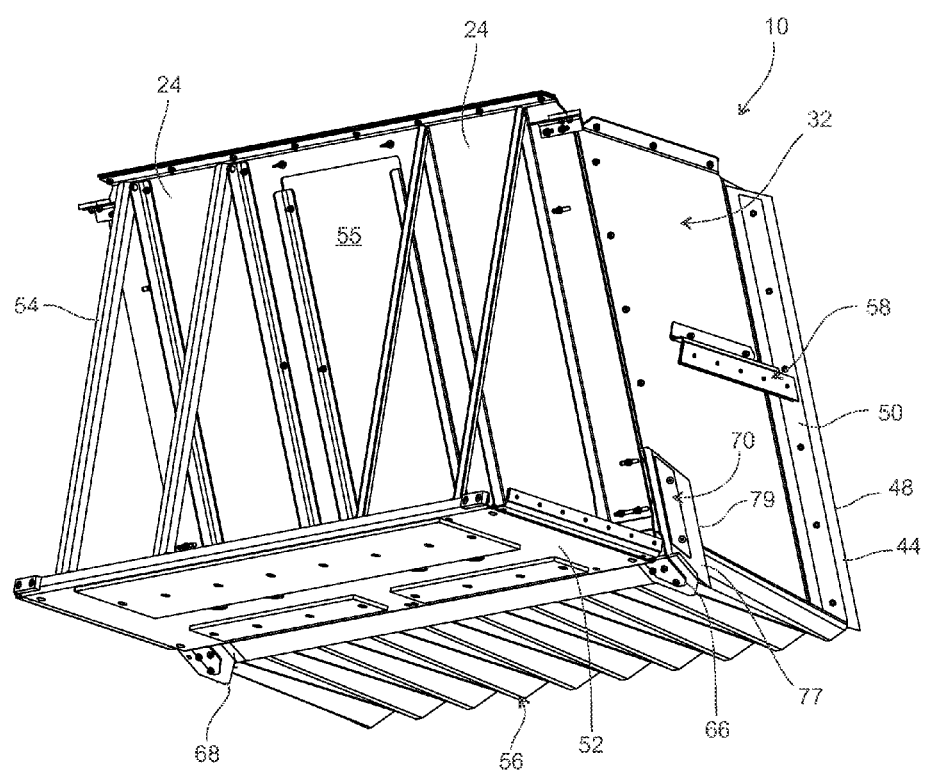
FIG. 4 is a view like FIG. 3, but is taken from a different perspective, looking at the rear and underneath the moving headboard.
Figure 5:
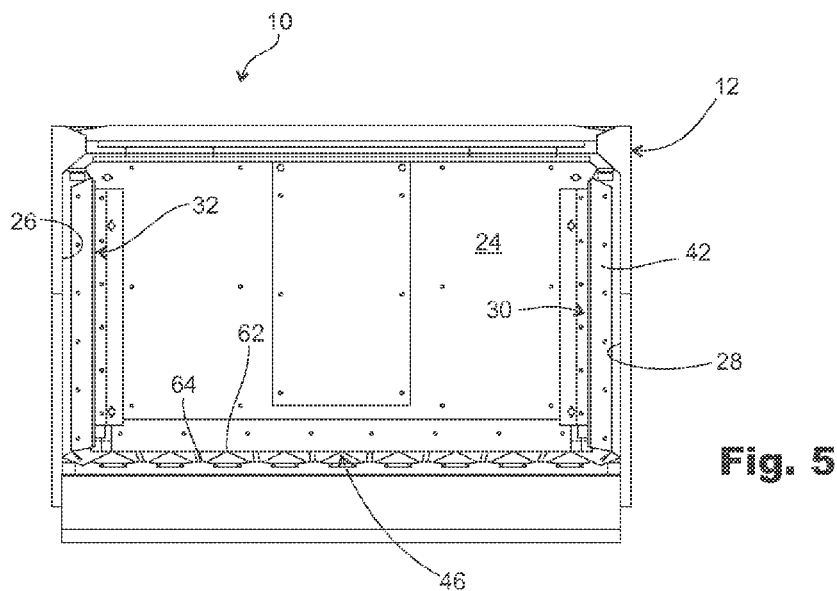
FIG. 5 is a frontal view of the moving headboard shown in FIGS. 3 and 4.
Figure 6:
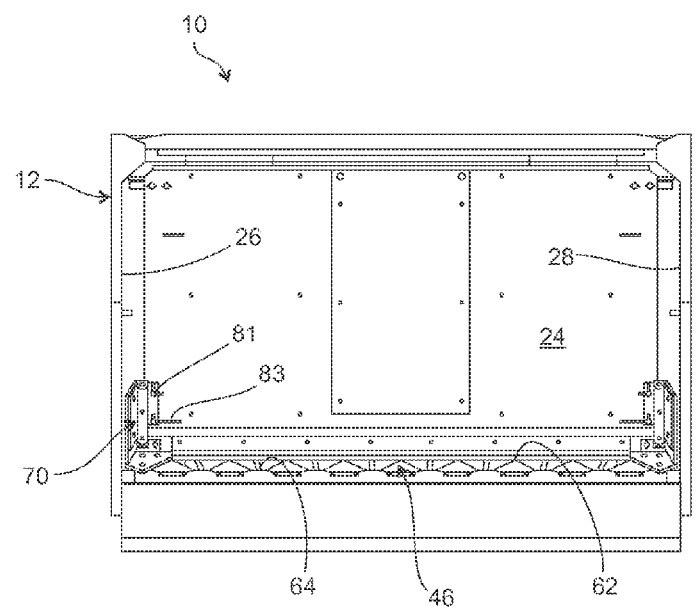
FIG. 6 is a view like FIG. 5, but with the headboard's side wings removed.

As indicated above, the headboard 10 is shown in the illustrations (see, e.g., FIG. 4) riding across a "peaked" floor system where the reciprocating slats are triangular in shape and come to an apex, as shown at 62 in FIGS. 5 and 6. This type of floor system generally has "V" valleys (indicated generally at 64) where stationary slats are located. In the embodiment illustrated, the headboard 10 has plow members 66, 68 mounted at each lower corner. These plow members 66, 68 ride within the V-shaped valleys adjacent to each lateral sidewall 26, 28.

As is also illustrated (see FIG. 4, for example), the headboard 10 has a rear, following edge portion, indicated at 70. This edge portion 70 may be regarded as a following wing that also floats on the sidewall, except near the place where wall meets floor. This rear wing member 70 swings freely and floats like the wing members 30, 32 described above. Although not specifically illustrated, its path of travel stops at or near the end of the trailer (see, e.g., region 72 in FIG. 9.

Figure 8:
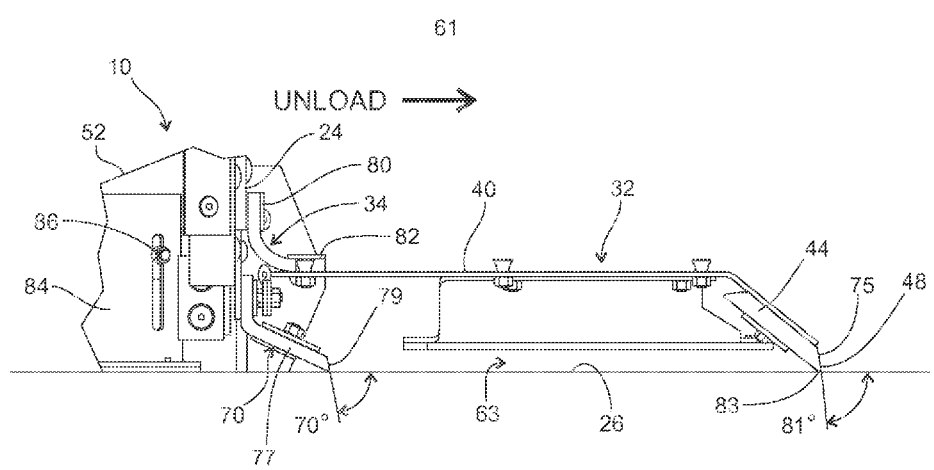
FIG. 8 is a top sectional view of one of the headboard's side wings and illustrates how the headboard's side wings are constructed for floating/wiping along a trailer's sidewall during an unloading operation.

FIG. 8 is provided as an illustration here for the purpose of providing more detail about the side wing and other parts described above. In particular, it identifies specific angles for the leading and rear edges described above.

Some of the figures (i.e., FIGS. 6, 7 and 9) show the headboard 10 with the side wings removed. This is done here simply to illustrate the location of the plow members 66, 68 and the rear edge member 70.

Figure 10:
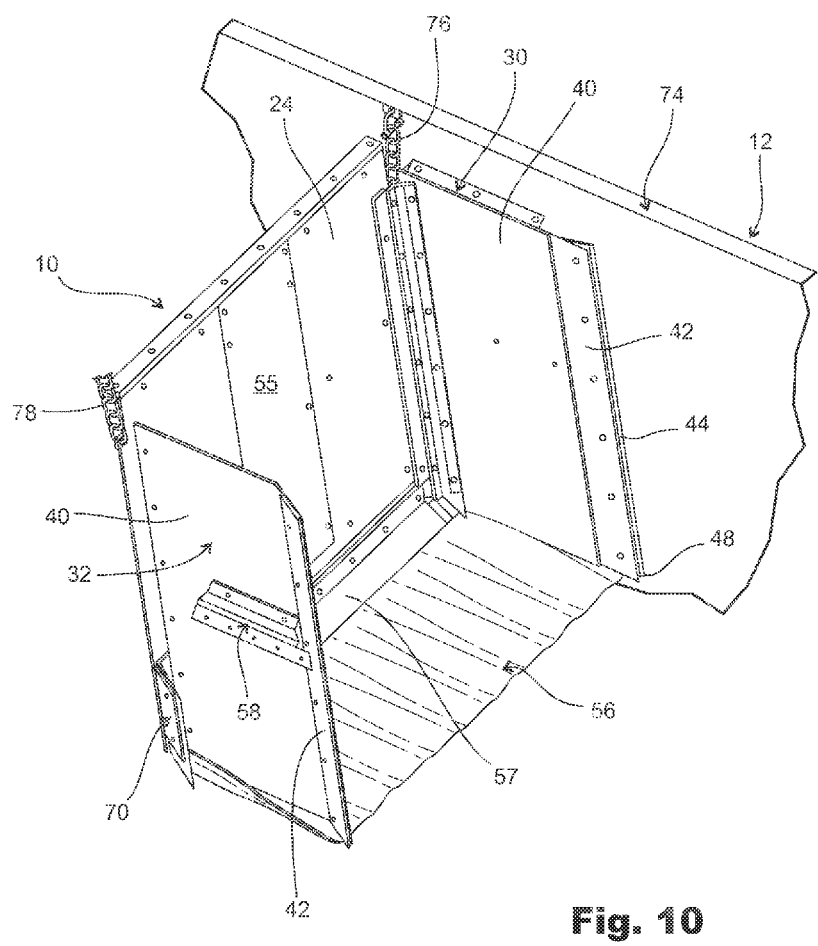
FIG. 10 is a pictorial view of another embodiment of the moving headboard

One other embodiment is shown in FIG. 10. Directing attention there, the headboard 10 illustrated in FIG. 10 lacks the base and brace members 52, 54 illustrated in FIG. 3.

This version suspends headboard part 24 to upper rails (the location is generally indicated at 74) via chains 76, 78. The chains are connected to wheels that roll within tracks 74. This type of upper suspension has been used as an alternative to create a vertical headboard structure with less supporting structure behind the headboard in situations where a trailer is built with tracks in the upper walls. Except for that difference, the overall functional operation of the FIG. 10 embodiment remains the same.

FIG. 8 more specifically illustrates the headboard/wiper structure. The edge 48 of the wiper material 44 comes to a point 83 against wall 26 (see FIG. 11). The angle of forward edge surface 75 relative to the wall 26 is about 9 degrees from a line normal to the wall (or 81 degrees from the wall surface). The forward edge surface 75 becomes essentially the same thing as the leading edge of a rubber wiper blade that terminates at point 83, although it is made of a much thicker and heavier material.

The rear or following edge portion 70 is configured with a similar wiping material 77 although, as mentioned above, it has a fixed angle. The forward edge surface 79 of the rear portion 70 is at an angle of about 70 degrees relative to the wall 26. As is best seen in FIG. 6, the rear wiper 70 can be laterally adjusted by bolts and slots 81, 83 to fit variations in trailer dimensions.

FIG. 8 also shows greater construction detail relative to how the flexible material 34 mounts side wing 32 to the headboard part 24 of the overall headboard structure 10. In the illustration, strips 80, 82 clamp the flexible "hinge" material 34 to backboard 24 and wing 32, respectively.

FIG. 8 also illustrates a lateral adjustment bracket 84. The position of the bracket 84 is adjustable via bolt 86. This allows the width of the headboard structure 10 to be adjusted to the trailer width. Plow members 66, 68 are carried by bracket 84 on each lateral side of the headboard 10.

Figure 9:
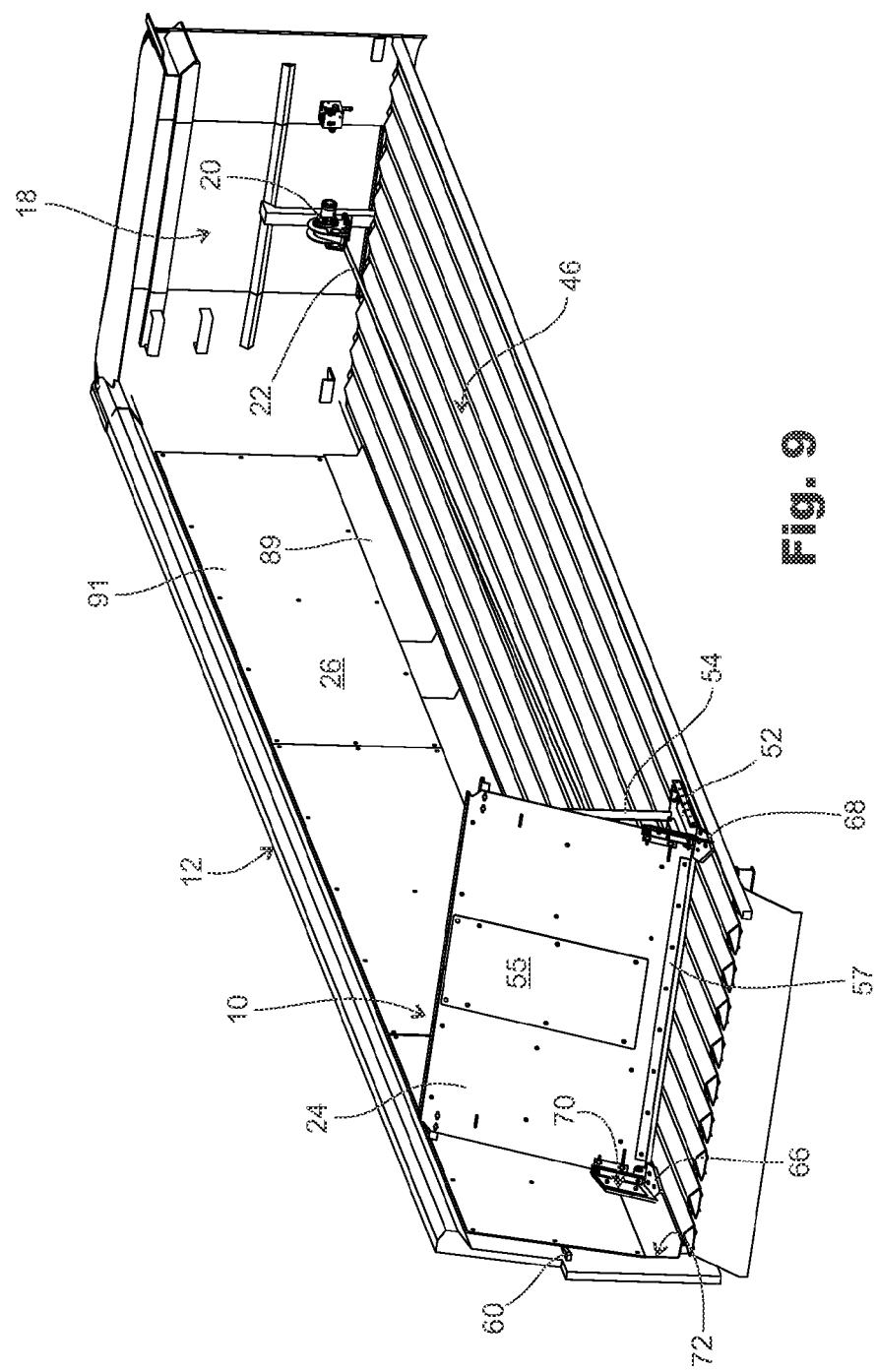
FIG. 9 is a view like FIG. 2, but shows the headboard with side wings removed.

Finally, referring to FIG. 9, the trailer sidewalls 26 may have material variations in the wall that help the functionality of the headboard structure 10. Specifically, a lower section 89 of the wall may be made of a different material, like steel sheeting, for example, to reduce friction near the floor 46, whereas upper parts of the wall 91 may be made of a different material such as aluminum.

An advantage to the foregoing headboard design is that it creates a design that is easy to assemble from packaged components. It can be shipped to any location for use in an existing trailer.

The foregoing description generally sets forth one or more preferred embodiments for carrying out the invention. It is not intended to limit the scope of patent protection to the specific embodiments. Instead, the scope of patent protection is to be limited by the patent claim or claims that follow, the interpretation of which is to be made in accordance with the doctrines of patent claim interpretation.

What is claimed is:

1. A cleanout apparatus for use inside a walled container, said apparatus being used to sweep material from the container as the conveyor unloads material carried by the container, the cleanout apparatus comprising:
    a headboard member substantially spanning the distance between two lateral container sidewalls;
    a flexible sheet connected to the cleanout apparatus, said flexible sheet riding on said conveyor, extending a distance forwardly of said headboard member, and providing a resting place for some of said material;
    a wing member laterally mounted with respect to each side of said headboard member, in a manner so that each wing member is free to at least partially swing about an axis, each wing member having a lateral baffle portion, extending forwardly of said headboard member, and defined by a surface that is shaped to direct said material laterally inwardly as said cleanout apparatus rides on said conveyor, said wing member further including a forward leading edge portion that is angled relative to both said baffle portion and said container wall, said forward leading edge portion having an edge that wipes against its respective container sidewall as said cleanout apparatus moves; and
    wherein said lateral baffle and forward leading edge portions are cooperatively arranged so that the material creates forces that float said wing member against said container sidewall and create a wiping action between said edge and said container sidewall as said cleanout apparatus moves inside said container.

2. The cleanout apparatus of claim 1, including a rail member mounted to an outer surface of said lateral baffle portion of said wing member, and a ramp member mounted to said sidewall wiped by said wing member, said rail member being arranged relative to said ramp member so that said rail member rides on said ramp member after said forward leading portion of said wing member passes said ramp, to hold said wing member laterally inwardly a certain distance relative to said sidewall.

3. The cleanout apparatus of claim 1, including a plow member adjacent a lower corner of said headboard member on opposite lateral sides of said headboard member, for cleaning material from said conveyor near each container sidewall.

4. The cleanout apparatus of claim 1, including a guide member adjacent said headboard member, on opposite lateral sides of said headboard member, said guide member being laterally adjustable for adapting the width of the apparatus to variations in width of said walled container.

5. The cleanout apparatus of claim 1, including a rear, following wing portion mounted to a lower lateral side of said headboard member, said rear wing portion being angled relative to both said headboard member and said container wall, and further, said rear wing portion being connected to said apparatus in a manner so that said rear wing portion swings freely so as to float against said container wall.

6. The cleanout apparatus of claim 5, wherein said rear wing portion comprises a blade that defines a following edge surface that terminates at a contact point that wipes against said container sidewall.

7. The cleanout apparatus of claim 6, wherein said following edge surface is arranged at an angle relative to said container sidewall.

8. The cleanout apparatus of claim 1, including a flexible member for connecting said wing member to said headboard member, to define a hinge that enables said wing member to swing relative to said headboard member.

9. The cleanout apparatus of claim 1, wherein said flexible sheet connected to said cleanout apparatus extends a distance forwardly of said headboard member, said distance reaching beyond said edge of said forward leading edge portion that wipes against said container sidewall and terminating adjacent to said edge of said forward leading edge portion.

10. The cleanout apparatus of claim 9, wherein said flexible sheet is wider than the distance between said container sidewalls, in a manner so that a lateral edge of said flexible sheet folds in a region adjacent a lower portion of said sidewall on each side of said container.

11. The cleanout apparatus of claim 1, wherein said edge of said forward leading edge portion comprises a blade having a leading edge surface that terminates at a contact point that wipes against said container sidewall.

12. The cleanout apparatus of claim 11, wherein said edge of said forward leading edge portion is arranged at an angle relative to said container sidewall.

13. A cleanout apparatus used to sweep material from a conveyor in a walled container, comprising:
   a base member that rides on the conveyor;
   a flexible sheet connected to the cleanout apparatus, said flexible sheet also riding on said conveyor and normally extending a distance forwardly of said base member and providing a resting place for some of said material;
   a headboard member extending upwardly from said base member and spanning the majority of the distance between two lateral container sidewalls;
   a wing member laterally mounted with respect to each side of said headboard member, in a manner so that each wing member is free to at least partially swing about an axis, each wing member having a lateral baffle portion defined by a surface that is shaped to direct said material inwardly relative to said container sidewalls as said cleanout apparatus moves along the length of said container, said wing member further including a forward leading edge portion that is angled relative to said baffle portion, said forward leading edge portion wiping against its respective container sidewall as said cleanout apparatus moves along the length of the container; and
   wherein said lateral baffle and forward leading edge portions are cooperatively arranged so that the material pushes against said headboard and wing member as said cleanout apparatus moves along said conveyor, thereby floating said wing member against said container sidewall and creating a sliding seal between said leading edge and said container sidewall.

14. The cleanout apparatus of claim 13, including a rail member mounted to an outer surface of said lateral baffle portion of said wing member, and a ramp member mounted to said sidewall wiped by said wing member, said rail member being arranged relative to said ramp member so that said rail member rides on said ramp member after said forward leading portion of said wing member passes said ramp, to hold said wing member laterally inwardly a certain distance relative to said sidewall.

15. The cleanout apparatus of claim 13, including a plow member adjacent a lower corner of said headboard member on opposite lateral sides of said headboard member, for cleaning material from said conveyor near each container sidewall.

16. The cleanout apparatus of claim 13, including a guide member adjacent said headboard member, on opposite lateral sides of said headboard member, said guide member being laterally adjustable for adapting the width of the apparatus to variations in width of said walled container.

17. The cleanout apparatus of claim 13, including a rear, following wing portion mounted to a lower lateral side of said headboard member, said rear wing portion being connected to said apparatus in a manner so that said rear wing portion swings freely so as to flat against said container wall.

18. The cleanout apparatus of claim 17, wherein said rear, following wing portion includes a blade that defines a following edge surface that terminates at a contact point that wipes against said container sidewall.

19. The cleanout apparatus of claim 13, including a flexible member for connecting said wing member to said headboard member, to define a hinge that enables said wing member to swing relative to said headboard member.

20. The cleanout apparatus of claim 13, wherein said flexible sheet connected to said cleanout apparatus extends a distance forwardly of said headboard member, said distance reaching beyond said edge of said forward leading edge portion that wipes against said container sidewall and terminating adjacent to said edge of said forward leading edge portion.

21. The cleanout apparatus of claim 13, wherein said edge of said forward leading edge portion comprises a blade having a leading edge surface that terminates at a contact point that wipes against said container sidewall.

* * * * *